(12) United States Patent
Chesney et al.

(10) Patent No.: US 10,873,807 B2
(45) Date of Patent: Dec. 22, 2020

(54) PROCESSING ECHOES RECEIVED AT A DIRECTIONAL MICROPHONE UNIT

(71) Applicant: XMOS LTD, Bristol (GB)

(72) Inventors: Sam Chesney, Abergavenny Monmouthshire (GB); Andrew Graham Stanford-Jason, Salisbury (GB); Hendrik Lambertus Muller, Crosthwaite (GB)

(73) Assignee: XMOS LTD, Bristol (GB)

( * ) Notice: Subject to any disclaimer, the term of this patent is extended or adjusted under 35 U.S.C. 154(b) by 0 days.

(21) Appl. No.: 16/635,910

(22) PCT Filed: Jul. 9, 2018

(86) PCT No.: PCT/EP2018/068498
§ 371 (c)(1),
(2) Date: Jan. 31, 2020

(87) PCT Pub. No.: WO2019/025124
PCT Pub. Date: Feb. 7, 2019

(65) Prior Publication Data
US 2020/0228896 A1 Jul. 16, 2020

(30) Foreign Application Priority Data

Aug. 1, 2017 (GB) .................................. 1712358.9

(51) Int. Cl.
*H04R 3/00* (2006.01)
*H04N 5/232* (2006.01)
(Continued)

(52) U.S. Cl.
CPC .......... *H04R 3/005* (2013.01); *G10L 15/1815* (2013.01); *G10L 15/20* (2013.01);
(Continued)

(58) Field of Classification Search
None
See application file for complete search history.

(56) References Cited

U.S. PATENT DOCUMENTS

| 9,689,960 B1 | 6/2017 | Barton et al. |
| 2014/0192999 A1 | 7/2014 | Sannino |

(Continued)

FOREIGN PATENT DOCUMENTS

| EP | 2 642 768 A1 | 9/2013 |
| WO | 2017/205966 A1 | 12/2017 |

OTHER PUBLICATIONS

British Search Report of GB1712358.9 dated Jan. 30, 2018.
(Continued)

*Primary Examiner* — Paul W Huber
(74) *Attorney, Agent, or Firm* — Sughrue Mion, PLLC (57) ABSTRACT

A method of using a directional microphone unit having an array of constituent microphones. Each of a plurality of the microphones receives substantially white noise via a direct path from a source, and also receives an echo comprising a reflection of the white noise from at least one surface, thereby obtaining a received noise signal comprising a combination of the directly-received noise and the echo. For each of the plurality of microphones, a spacing is identified between lobes and/or troughs in a respective spectrum of the received noise signal as received by the respective microphone, thereby determining an additional distance travelled by the echo to the respective microphone relative to the direct path. A direction of the source is calculated based on the additional distance travelled for each of said plurality of microphones.

23 Claims, 6 Drawing Sheets

(51) Int. Cl.
*G10L 15/18* (2013.01)
*G10L 15/20* (2006.01)
*G10L 15/22* (2006.01)
*G10L 21/0232* (2013.01)
*G10L 25/51* (2013.01)
*H04R 1/40* (2006.01)
G10L 21/0208 (2013.01)
G10L 21/0216 (2013.01)

(52) U.S. Cl.
CPC .......... *G10L 15/22* (2013.01); *G10L 21/0232* (2013.01); *G10L 25/51* (2013.01); *H04N 5/23299* (2018.08); *H04R 1/406* (2013.01); G10L 2021/02082 (2013.01); G10L 2021/02166 (2013.01); H04R 2201/401 (2013.01)

(56) References Cited

U.S. PATENT DOCUMENTS

2014/0274212 A1 9/2014 Zurek et al.
2016/0358619 A1* 12/2016 Ramprashad ........... G10L 15/20

OTHER PUBLICATIONS

International Search Report of PCT/EP2018/068498 dated Oct. 2, 2018 [PCT/ISA/210].
Written Opinion of PCT/EP2018/068498 dated Oct. 2, 2018 [PCT/ISA/237].

* cited by examiner

PROCESSING ECHOES RECEIVED AT A DIRECTIONAL MICROPHONE UNIT

TECHNICAL FIELD

The present disclosure relates to a directional microphone unit comprising an array of constituent microphones. Particularly, the disclosure relates to scenarios where the directional microphone unit is placed nearby a hard surface which reflects back an echo that is received by the microphone unit in addition to the directly-received instance of the same sound.

BACKGROUND

A directional microphone unit is a microphone unit that comprises multiple individual constituent microphones, with the constituent microphones being arranged in an array with a known (typically regular) spacing relative to one another. This enables the use of receive beam-forming techniques, whereby sound is selectively received from within a certain beam, i.e. focussing the sensitivity of the receiver on sound originating from the region of space within the beam and supressing the sensitivity of the receiver to sound originating from regions outside the beam. This is achieved by multiplying the individual signal received from each microphone in the array by a different respective weight (which in general may be complex). Receive beam-forming may also be referred to as spatial filtering. Details of receive beam-forming techniques will be familiar to a person skilled in the art.

Directional microphone units are now incorporated into many types of user device in the home, office or elsewhere, for instance in "smart" TV sets or set-top boxes, or other smart appliances. One use for such microphone units is to allow voice control of the device. E.g. the user can speak a voice command to invoke a certain function of the device such as to turn the volume up or down, mute, change channel, or such like, which is picked up by the microphone unit incorporated in (or perhaps connected to) the user device and recognized by a speech recognition algorithm embedded in the user device (or perhaps hosted on a server in a network such as the Internet to which the user device is connected). The user device is arranged to then act on the command accordingly.

Such devices tend to be placed near hard surfaces such as walls. This causes a problem in that the hard surface reflects back an echo which may interfere with the directly received instance of the same sound. Conventional systems such as those used for speech recognition in smart TVs, or the like, simply ignore this effect in the hope that the self-interference from the echo is small enough to be negligible. However, in practice this is not always the case, so that processes such as speech recognition may fail or become unreliable. For instance this can happen when a user device like a smart TV or set-top box is placed adjacent to a wall, which is common in many homes. As a result the user will be frustrated that the voice control is apparently unreliable, whereas in fact the issue is the echo caused by the placement of the TV set.

Acoustic Echo Cancellers (AEC) are known. However these only remove an echo of a known signal emitted by the user device itself back to the user device's own microphone unit. E.g. the TV's AEC knows it is emitting a certain audio signal from the loudspeaker(s) of the TV as part of the content being playing out, and so can remove the echo of this known content from the received signal. However, this does not deal with the separate issue of the echo of the target sound source, e.g. the person speaking a voice command or the like, which is external to the user device. The user device itself is not issuing this sound and so cannot remove it using AEC techniques.

SUMMARY

It is recognized herein that the echo of sound from an external source can in fact be exploited to detect the geometry of the system. Particularly, the system formed by the source, microphone unit and reflecting surface will have a certain frequency response whereby at some frequencies the echo will constructively interfere with the direct path and at other frequencies the echo will destructively interfere (wherein the spectral locations of the constructive and destructive interference depend on the position of the microphone unit relative to the surface). Thus if the received noise is substantially white in nature—i.e. having energy spanning a range of frequencies—then the combined effect of this with its own echo can be exploited to detect the frequency response of the system. This can then be used to target some desired process on the direction from which the noise originates, e.g. to direct a receive beam of the directional microphone toward the source, or to direct a camera or visual indicator toward the source. E.g. much of human speech contains white noise in the form of plosives ("p", "t", "g" sounds, etc.) and fricatives ("f", "v", "s" sounds, etc.); and this inherent white noise in peoples' speech can thus be exploited to detect the position of the person speaking, e.g. to enhance speech recognition by directing a receive beam toward the detected direction. Alternatively the source could be a source of unwanted noise to be avoided by the receive beam, e.g. a noisy appliance such as a dishwasher or air conditioning unit which may otherwise interfere with the speech recognition.

According to one aspect disclosed herein, there is provided a method of using a directional microphone unit, the directional microphone unit comprising an array of constituent microphones spaced apart from one another, and the method comprising: at each respective one of a plurality of the microphones, receiving substantially white noise via a direct path from a source of the white noise and also receiving an echo comprising a reflection of the white noise from at least one reflective surface, and thereby obtaining a received noise signal comprising a combination of the directly-received noise and the echo as received by the respective microphone; for each of the plurality of microphones, identifying a spacing between lobes and/or troughs in a respective spectrum of the received noise signal as received by the respective microphone, thereby determining an additional distance travelled by the echo to the respective microphone relative to the direct path; calculating a direction of the source based on the additional distance travelled for each of said plurality of microphones; and based on the calculated direction of the source, directing one or more directional sensors and/or indicators to target or avoid the source of the noise.

In embodiments, the one or more directional sensors may comprise at least said directional microphone unit, said directing comprising applying a respective weight to each of the microphones in the array, thereby forming a receive beam that targets or avoids the source of the noise.

In embodiments, the source may comprise a person, and the white noise may comprise a plosive or fricative sound spoken by said person.

In embodiments said directing may comprise controlling the sensor and/or indicator to target the person.

In embodiments said calculating may comprise solving a set of simultaneous equations, each equation in the set relating the additional distance travelled by the echo to each respective one of the plurality of microphones to three unknowns: a distance of the microphone unit from the surface, an angle of the source relative to the microphone unit, and a rotation of the microphone unit relative to the surface.

In embodiments, the method may comprise using an echo cancelling algorithm to determine a distance of the microphone from the surface and a rotation of the microphone from the surface, and then combining with the spacing to determine the direction of the source.

In embodiments said calculating may comprise applying a numerical optimization algorithm.

In embodiments, the method may comprise performing a sound recognition algorithm to recognize one or more elements in sound received via said directional microphone unit, and wherein said directing may comprise controlling the receive beam to target the source of said noise as part of the sound recognition.

In embodiments, the sound recognition algorithm may comprise a speech recognition algorithm for recognizing an intention in the person's speech, and wherein said directing comprises controlling the receive beam to target the direction of the person as part of the speech recognition.

In embodiments, the method may comprise performing a sound recognition algorithm to recognize one or more elements in sound received via said directional microphone unit, and said directing may comprise controlling the receive beam to avoid the direction of the source during the sound recognition.

In embodiments, the sound recognition algorithm may comprise a speech recognition algorithm for recognizing an intention in a person's speech, and said directing may comprise controlling the receive beam to avoid the source of the noise during the speech recognition.

In embodiments, the source of the noise may be a household or office appliance.

In embodiments, the household appliance may comprise a washing machine, dishwasher, air-conditioning unit, heating unit, fan unit, kettle, printer, photocopier or scanner.

In embodiments, the one or more directional sensors may comprise a camera or other non-audio sensor, and said directing may comprise directing the camera or other non-audio sensor toward the direction of the source.

In embodiments, said directing may comprise controlling the indicator to indicate a direction of the source of said noise to a user.

In embodiments, said indicator may comprise a light or other visual indicator arranged to indicate said direction by indicating a position of the source.

In embodiments, the method may further comprise: performing a sound recognition algorithm to recognize one or more elements in sound received via said directional microphone unit; identifying spectral locations of the lobes and/or troughs; and on a per frequency band basis, selecting one or a subset of the microphones of the array not experiencing troughs in the frequency band, and using only the selected one or subset of microphones to receive the sound for said sound recognition.

In embodiments, the sound recognition algorithm may comprise a speech recognition algorithm for recognizing an intention in the person's speech, only the selected one or subset of the microphones being used to receive the speech for said speech recognition.

In embodiments, the method may further comprise, based on the respective spectrum, equalizing one or more of the microphones to at least partially reverse a frequency response caused by the echo.

In embodiments, said echo may comprise a reflection of the white noise from a plurality of reflective surfaces; said identifying may comprise modelling the received noise signal as a superposition of respective spectra resulting from each of the surfaces, and identifying the spacing between lobes and/or troughs in the respective spectrum of each surface, thereby determining an additional distance travelled by the echo from each surface relative to the direct path; and said calculating of the direction of the source may be based on the additional distances travelled via each of said surfaces.

According to another aspect disclosed herein, there is provided a computer program product embodied on computer-readable storage and configured so as when run on one or more processing units to perform operations in accordance with any method disclosed herein.

According to another aspect, there is provided a user device comprising the directional microphone unit and control logic configured to perform operations in accordance with any method disclosed herein.

In embodiments, the control logic may comprise memory comprising one or more memory units and processing apparatus comprising one or more processing units, the memory storing code arranged to run on the processing apparatus, and the code being configured so as when run on the processing apparatus to perform the method.

BRIEF DESCRIPTION OF THE DRAWINGS

To aid understanding of the present disclosure and to show how embodiments may be put into effect, reference is made, by way of example only, to the accompanying drawings in which.

DETAILED DESCRIPTION OF EMBODIMENTS

Figure 6:
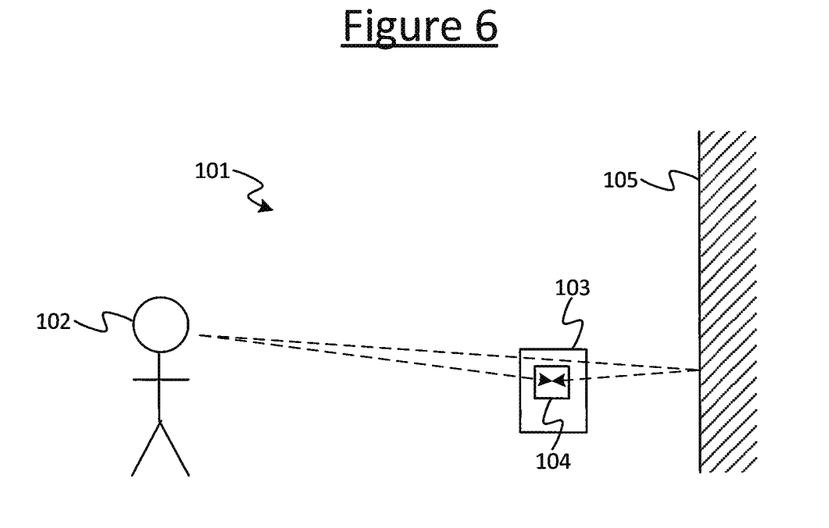
FIG. 6 schematically illustrates a system comprising the source, the reflecting surface, and a user device comprising the directional microphone.

FIG. 6 shows a system 101 comprising a sound source 102 which emits sound, a reflecting surface 105 from which this sound is reflected, and a user device 103 comprising a directional microphone unit 104. For instance the source 102 could be a person speaking voice commands to the user device 103, and the user device 103 could be any voice-controlled device such as a TV set, set-top box, music-player, computer terminal, or even a robot assistant or robot pet.

The sound from the source 102 is received by the microphone unit 104 via a direct path (i.e. the shortest path, typically a single straight line path between the source 102 and the microphone unit 104). However, another instance of the same sound is also received by the same microphone unit 104 via a longer echo path, reflected via the reflective surface 105. Thus there will be a degree of self-interference due to the echo, which can disrupt processes that are based on the receipt of the sound from the source 102, such as speech recognition.

Figure 7:
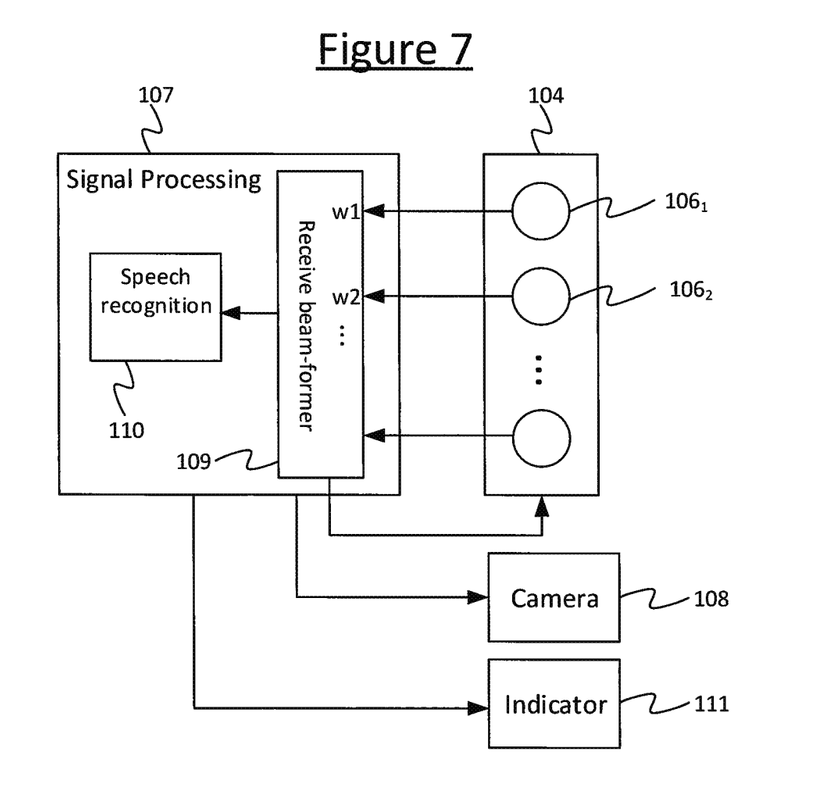
FIG. 7 is a schematic block diagram of the user device.

FIG. 7 shows more detail of the user device 103 including the directional microphone unit 104. The directional microphone unit 104 comprises an array of multiple individual microphones 106, spaced apart from one another in a known, fixed spatial configuration (e.g. regular spatial intervals) so as to enable receive beam-forming in the known manner. The relative spacing and layout microphones 106 may be pre-known or may be learned from multiple empirical data points collected after deployment. Each of the microphones 106 is arranged to sample sound from its environment and output a respective signal representative of the sampled sound, and to supply the respective signal to a signal processing module 107.

The signal processing module 107 may be incorporated within the housing of the user device 103, or may instead be implemented on a server to which the user device 104 is connected via a suitable network (e.g. the internet), or a combination of the two. Note also that in the case of a server, this refers to a logical entity which may comprise one or more server units at one or more geographical sites. The signal processing module 107 may be implemented in the form of code stored in memory and arranged to be run on a processing apparatus (the memory comprising one or more memory units at one or more locations employing one or more storage media, e.g. magnetic memory such as a hard drive or electronic memory such as a solid state drive; and the processing apparatus comprising one or more processing units at one or more locations). Alternatively it is not excluded that the signal processing module 107 may be implemented in dedicated hardware circuitry, or configurable or reconfigurable hardware circuitry such as a PGA (programmable gate array) or FPGA (field programmable gate array).

By whatever means implemented, the signal processing module 107 is configured to receive the respective signal from each of the separate microphones 106 in the array. In embodiments the signal processing module 107 comprises a receive beam-forming algorithm 109 configured to apply a different respective weighting w1, w2, . . . to the received signal from each of the microphones $106_1$, $106_2$, . . . so as to isolate sound incident from within a specific, selected spatial region relative to the microphone unit 104, i.e. the receive beam. In embodiments other algorithms may be used to improve the beam, such as for example side-lobe cancellers, MVDR (minimum variance distortionless response) or LCMV (linearly constrained minimum variance).

The signal processing module 107 may also comprise a speech recognition algorithm 110 configured to receive the sound isolated by the beam-forming algorithm 109 and to recognize an intention of the person speaking, e.g. to recognize one or more predetermined keywords or to recognize the intention based on more sophisticated natural language processing (NLP) or machine learning techniques. For instance the speech recognition algorithm may be configured to enable the user 102 to control one or more functions of the user device 103 by voice command, such as to adjust a volume of the device, mute the device, change channel, open a chosen application, turn on or off the device, put the device into sleep mode or wake it from sleep mode, etc. Alternatively or additionally, the signal processing module 107 may be arranged to control the direction of another, non-audio sensor such as a directable camera 108 in order to direct it toward the source of a detected sound in the environment. For example this could be useful to focus on a person 102 speaking during a video conference conducted via the camera 108 and microphone unit 104. In further alternative or additional embodiments, the signal processing module 107 may be configured to control an indicator 111 to indicate a certain location or direction in the environment of the microphone, e.g. a visual indicator such as a set of lights with one by each seat in a room, which the signal processing module 107 can cause to light up to indicate the position of a person detected to be currently speaking.

Figure 2:
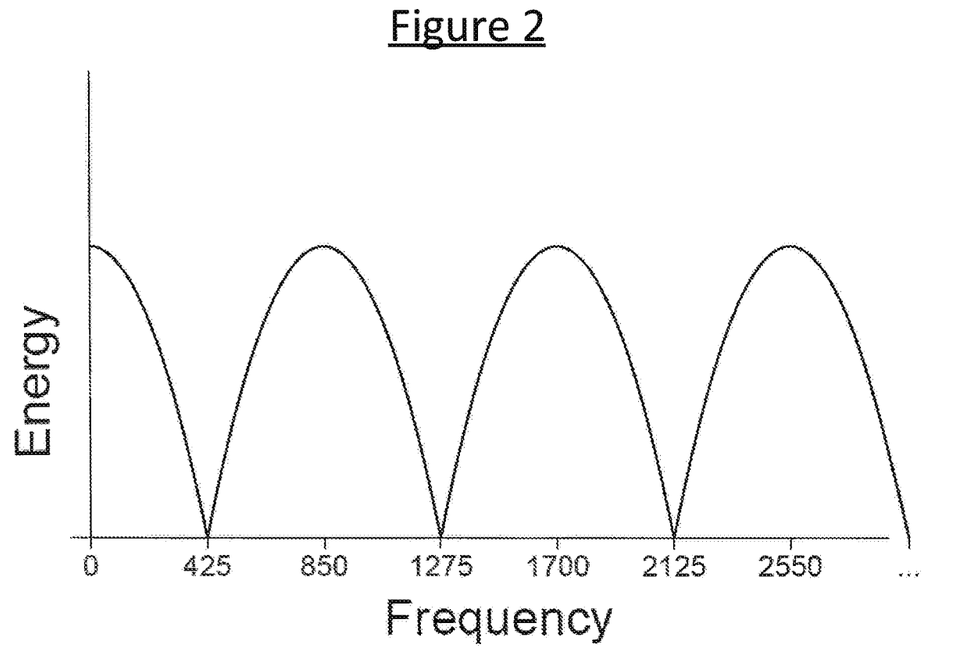
FIG. 2 schematically illustrates a "comb" shaped frequency response formed in the frequency spectrum due to reflection.

Furthermore, it is recognized herein that with the microphone unit 104 having multiple microphones at a location close to a hard surface 105 (e.g. a living room or kitchen wall), then the echo from the hard surface can in fact be used to improve the interpretation of received sounds. Particularly, the hard surface 105 will cause constructive and destructive interference of the signal as it is observed by each of the microphones 106. If the echoed sound comprises white noise, i.e. spanning a range of frequencies, then this will enable the signal processing module 107 to build up a picture of the frequency response of the system. This is illustrated in FIG. 2 (to be discussed again in more detail shortly). Here it can be seen how the self-interference between the signal and its echo results, in the frequency domain, in a "comb" of alternating lobes and nulls with the lobes being caused by constructive interference between the signal and its echo and the nulls being causes by destructive interference between the signal and its echo. Note of course that the response shown in FIG. 2 is idealized, and in practice the shape of the frequency response may deviate somewhat from the mathematically idealized case. For instance the received energy at the nulls won't normally go completely to zero, e.g. because sound may be attenuated by the (not completely) hard surface 105. Hence a "null" as referred to herein means a trough or minimum in the response, not necessarily an absolute zero.

White noise contains a substantive energy across a range of frequencies sufficient to build up a frequency response comprising at least a plurality of peaks or a plurality of nulls. For best reconstruction of the response the noise energy will be approximately flat across this range. It will be appreciate of course that no noise is perfectly white, i.e. no real-life signal can have a perfectly even signal energy across an unbounded frequency range. The key for the present purposes is that it is sufficiently white to reveal enough of the frequency response of the system to enable the signal processing module 107 to take the desired action to target a wanted source of the noise (e.g. in the case where the noise is an inherent part of a wanted speech signal to be detected as part of a speech recognition algorithm), or to avoid the unwanted source of the noise (e.g. a noisy appliance to be ignored in the speech recognition). As will be seen shortly, in practice this means being sufficiently white to reveal at least two instances of a repeating feature in the frequency response, e.g. two lobe peaks or two nulls.

Hence according to the present disclosure, the signal processing module 107 begins by collecting a sample of white noise from each of the microphones 106. There are a number of ways of doing this. One way is to rely on a long-term accumulations of sound, i.e. by aggregating the received signal over long-enough duration that it can be assumed a suitable range of frequencies will be covered. An alternative approach is to actively analyse the spectrum of the received signal and detect when it exhibits the excepted response for white noise over a sufficient range (i.e. to recognize the comb shaped response—see again FIG. 2—and infer this is not naturally produced). Whatever approach is taken, the signal processing module then proceeds to detect the spacing between periodic features in the frequency response (i.e. the comb), and to use this to determine the geometry of the system, based on techniques to be discussed in more detail shortly. Based on the detected geometry, the signal processing module 107 can then take steps to target or avoid a source of the noise in the spatial and/or frequency domain.

The signal processing module 107 is at least configured to target or avoid a certain direction, such as by steering a receive beam of the microphone array 104, steering a camera or other sensor, or controlling a visual indicator, toward or away from the direction in question. Additionally, in embodiments the signal processing module 107 may further hone in the detection on the source by selecting which microphones to listen to and which to ignore per frequency band, thus targeting the source in the sense of targeting those microphones that best receive the sound from the source in each band (i.e. ignoring microphones that experience a null in the frequency band in question). In the cases of the beam-forming or the microphone selection, the weights w of the received signals from some or all of the different respective microphones 106 are adapted in dependence on the identified spectral distribution. In the one case the weights are controlled to form and steer a beam. In the other case the weights are simply controlled to be zero or non-zero on a per frequency band basis so as to avoid the nulls in the frequency response. As another optional addition, the measured spectrum can be used to equalize the weights, to at least partially undo the effect of the echo on the frequency response of each microphone.

The following describes, with reference to FIGS. 1 to 5, the principle behind the use of the echo to detect the geometry of the system 101, and an example of a process which may be implemented by the signal processing module 107 to exploit this.

Figure 1:
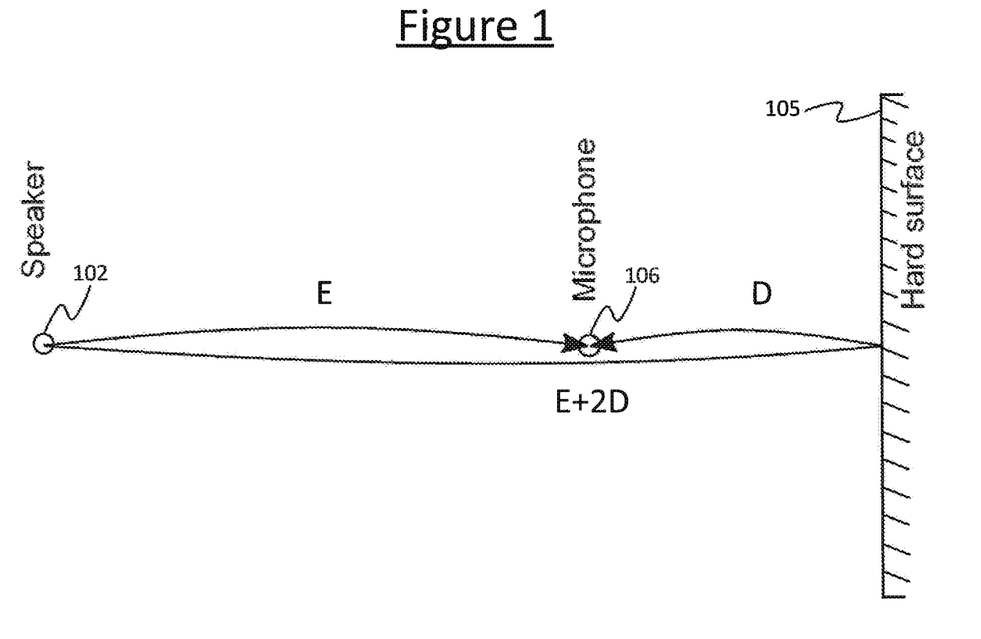
FIG. 1 schematically illustrates 1D reflection from a hard surface.

FIG. 1 illustrates a given microphone which is a distance D from the hard surface 105, and a distance E from the source 102 (e.g. a person speaking a natural language) in the opposite direction. The direct signal from the source 102 will travel a distance E, and the first echo will travel a distance E+2D. The difference between the direct signal and the first echo, 2D in this case, governs whether signals will be amplified or attenuated by the echo. This distance is referred to herein as g.

Consider a signal with a wave-length w, and a perfect reflection, then if $g=w/2$ the signal will destructively interfere (causing a null), if $g=w$ the signal will constructively interfere (causing a lobe). In general nulls occur, when $g=(2k+1)w/2$ (for any integer k) and the peaks of the lobes occur where $g=kw$ for any integer k. The wave-length w of the signal is related to its frequency f by dividing the speed of sound c by the frequency f: $w=c/f$. As an example, say that D is 200 mm and g is 400 mm, then the first null will occur where w is 800 mm, the first lobe will occur where g is 400 mm, and subsequent nulls occur for $w=2g/(2k+1)$ at wavelengths of 800/3, 800/5, 800/7, etc. And further lobes occur where $w=g/k$, which is at wavelengths of 400/2, 400/3, etc. Assuming the speed of sound is 340 m/s, this works out as nulls at 425, 1275, 2125, . . . Hz, and lobes at 850, 1700, 2550, . . . Hz.

If a white noise is transmitted by the source (e.g. a human speaker emitting a plosive or fricative), then the spectral composition of resulting signal that is picked up by the microphone 106 will look like a comb, as is shown in FIG. 2. By measuring the spacing between lobes or nulls in this spectrum in terms of frequency or wavelength, it is possible to measure g (i.e. 2×the extra distance along the echo path) for the microphone 106 in question. Furthermore, given a data point for g for three or more such microphones 106, it is possible to eliminate enough unknowns to detect the direction of the source 106.

The distances between the lobes of the "comb" depend on the distance D between the microphone unit 104 and the wall, and, on the location of the source 102. The example above assumed a 1-dimensional case where the line between the source 102 and wall 105 was orthogonal to the wall (or more generally surface), in line with the microphone 106. In the general 3-dimensional case the source 102 will be at a location s in space.

Figure 3:
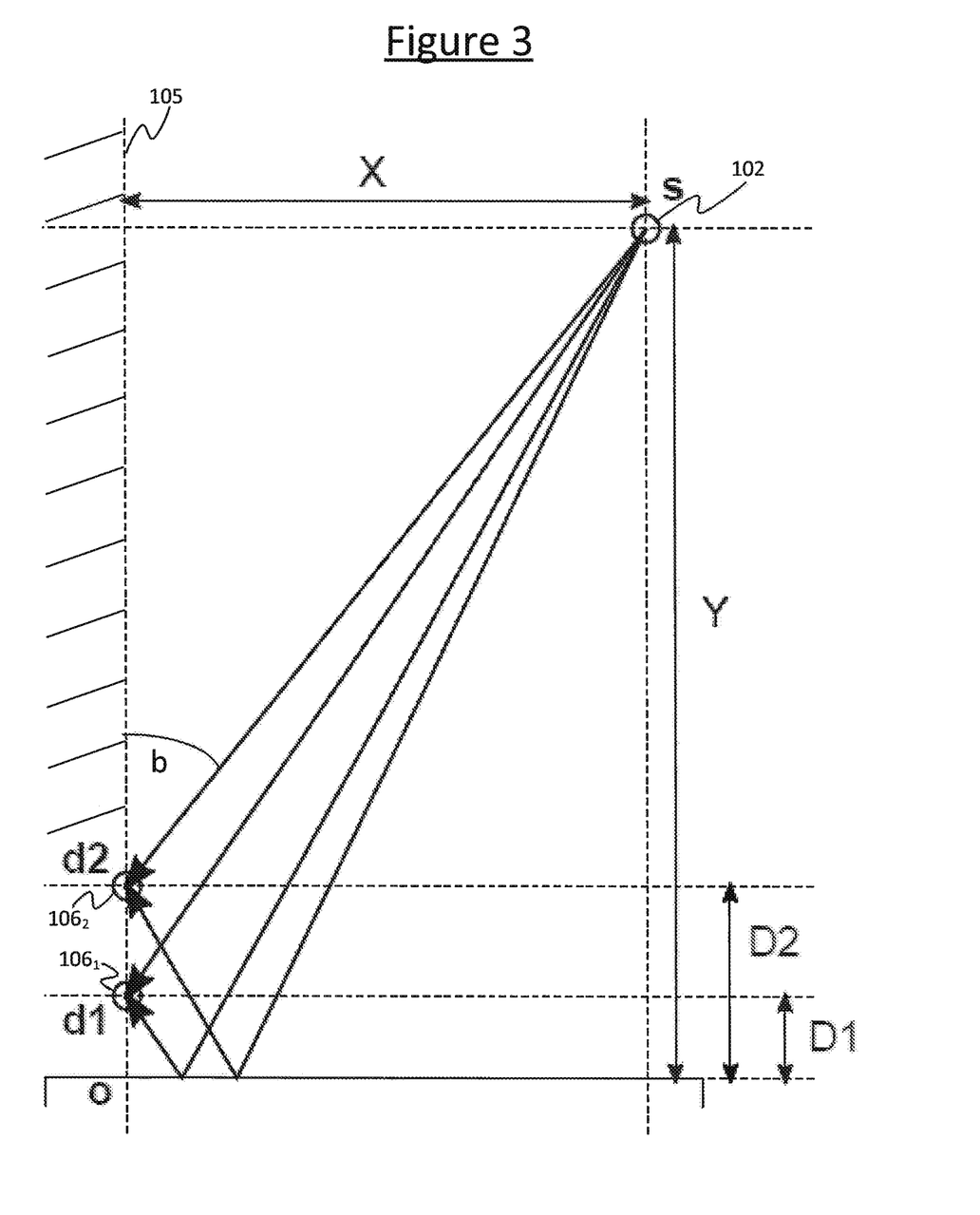
FIG. 3 schematically illustrates 2D reflection from a hard surface.

Without loss of generality, a 2-dimensional example is depicted in FIG. 3, wherein the origin o of the coordinate system shown is placed at the reflective surface 105 nearest to the microphone unit 104, and the microphones 1 and 2 (i.e. $106_1$ and $106_2$) are at locations d1 and d2. Here, s is at location (X,Y), d1 is at location (0,D1), and d2 is at location (0,D2).

Studying the geometry of this gives the following.

Figure 4:
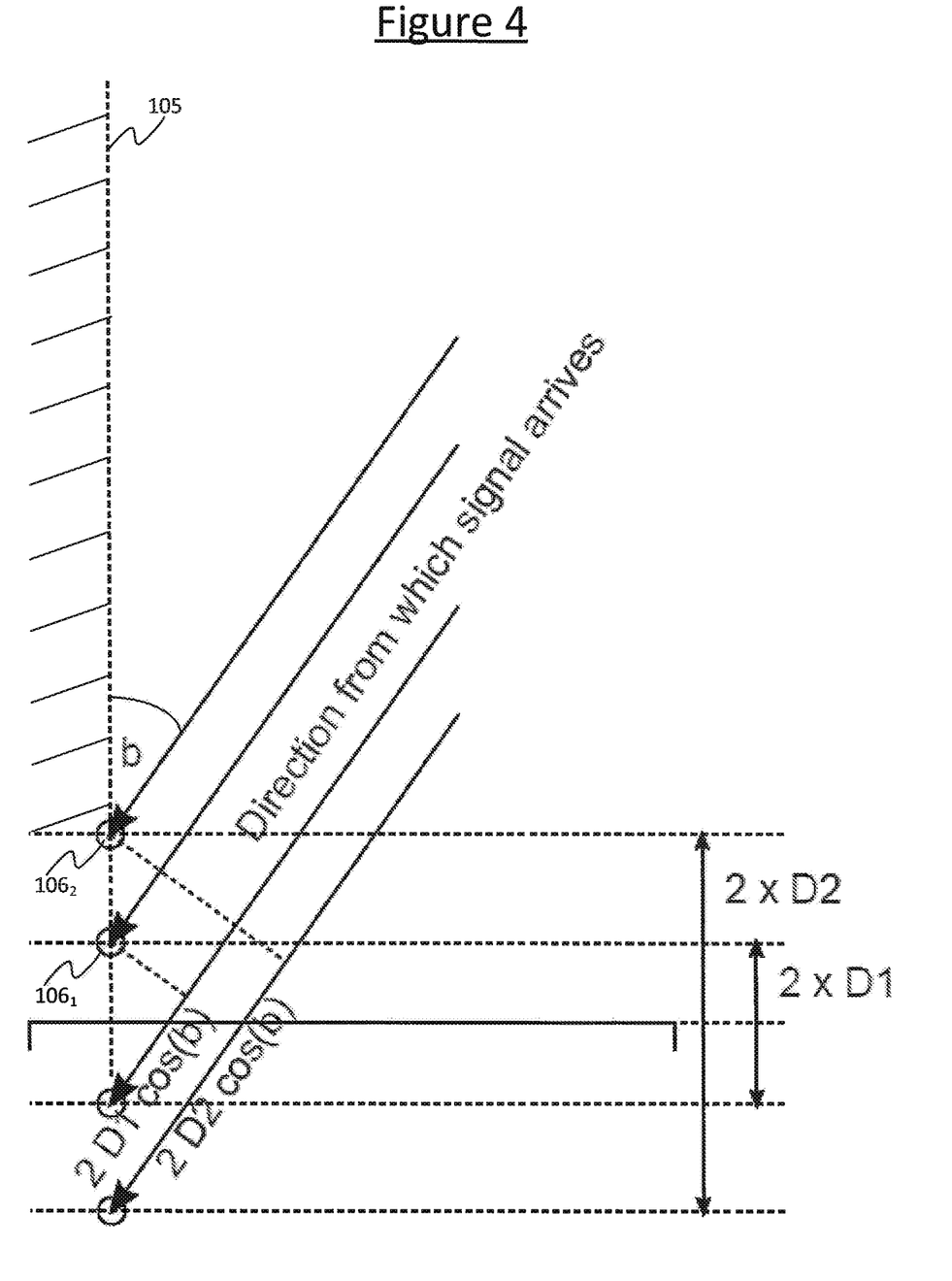
FIG. 4 schematically illustrates far field reflection from a hard surface.

The direct distance from the speaker to microphone 1 is
$|s-d1|=\mathrm{sqrt}(X^2+(Y-D1)^2)$, the direct distance from the speaker to microphone 2 is
$|s-d2|=\mathrm{sqrt}(X^2+(Y-D2)^2)$, the first echo from the speaker to microphone 1 is
$|s-d1'|=\mathrm{sqrt}(X^2+(Y-D1)^2)$, and the first echo from the speaker to microphone 2 is
$|s-d2'|=\mathrm{sqrt}(X^2+(Y+D2)^2)$ where d1' and d2' are the locations d1 and d2 reflected in the surface, as shown in FIG. 4 (put another way, d1' and d2' are the points at which the echo path would hit X=0 if projected back through the surface rather than being reflected by it).

The difference in distance between the direct signal and the microphone is, for microphones 1 and 2 respectively:

$$\mathrm{sqrt}(X^2+(Y-D1)^2)-\mathrm{sqrt}(X^2+(Y+D1)^2), \text{ and} \qquad \text{Equation [i]}$$

$$\mathrm{sqrt}(X^2+(Y-D2)^2)-\mathrm{sqrt}(X^2+(Y+D2)^2), \qquad \text{Equation [ii]}$$

which can be used for g in the earlier derivation of the placements of lobes and nulls in the spectrogram. This shows that different microphones will exhibit different spectral responses, which in turn will enable the signal processing module 107 to work out the geometry of the system.

The example above does not have simple analytical solution, but can be solved numerically. One can approximate far-field behaviour by assuming that $\mathrm{sqrt}(X^2+Y^2)$ is much larger than D1 and D2. Given that the signal arrives from an angle b, the expressions above work out such that the extra path (i.e. g) is $2 \times D1 \times \cos(b)$ for microphone $106_1$, and $2 \times D2 \times \cos(b)$ for microphone $106_2$; which shows that the comb has a different shaped frequency response for the two microphones $106_1$ & $106_2$, and hence when white noise is produced, the profile of the combs in the frequency domain can be used to calculate the angle of arrival of the signal. And/or, the measured profile can be used to rectify the signal and straighten out the frequency response of the microphone.

Unlike traditional direction-of-arrival methods this method does not require correlations to be computed between pairs of microphones. In order to compute the direction of arrival, one would normally take the signals received by a pair of microphones, and try to work out what delay would be needed to align the signals. E.g. if delaying one signal by 160.287 μs aligns it with the others, this gives a difference in time of flight, so one can work out a direction (assuming far field) that the signal came from. This computation can be done in the time or frequency domain, but always amounts to computing the relative delay in the time domain (or phase shift in the frequency domain).

Instead of this however, embodiments of the present disclosure instead measure the combs, and then compute the relative position of hard surface, speaker, and microphone. That is, for each of three of more microphones 106, the signal processing module 107 measures the spacing between lobes or nulls in the collected spectrogram for each microphone 106, and equates this to extra path difference g, which equals 2Dn×cos(b) in the above geometric equations. In general in fact, the array of microphones is not necessarily a linear array perpendicular to the surface. However, with a known relationship between the positions of the microphones 106 in space, the different paths for each microphone 106 may be related to one another. Assuming that the hard surface 105 is vertical (e.g. a wall), there are a total of three unknowns that are to be found:

the angle b of the direction of the source 102 (in embodiments this is the unknown that is really of interest),
the distance Dc between the microphone unit 104 and the hard surface, and
the rotation a of the microphone array 104 relative to the hard surface 105.

Figure 5:
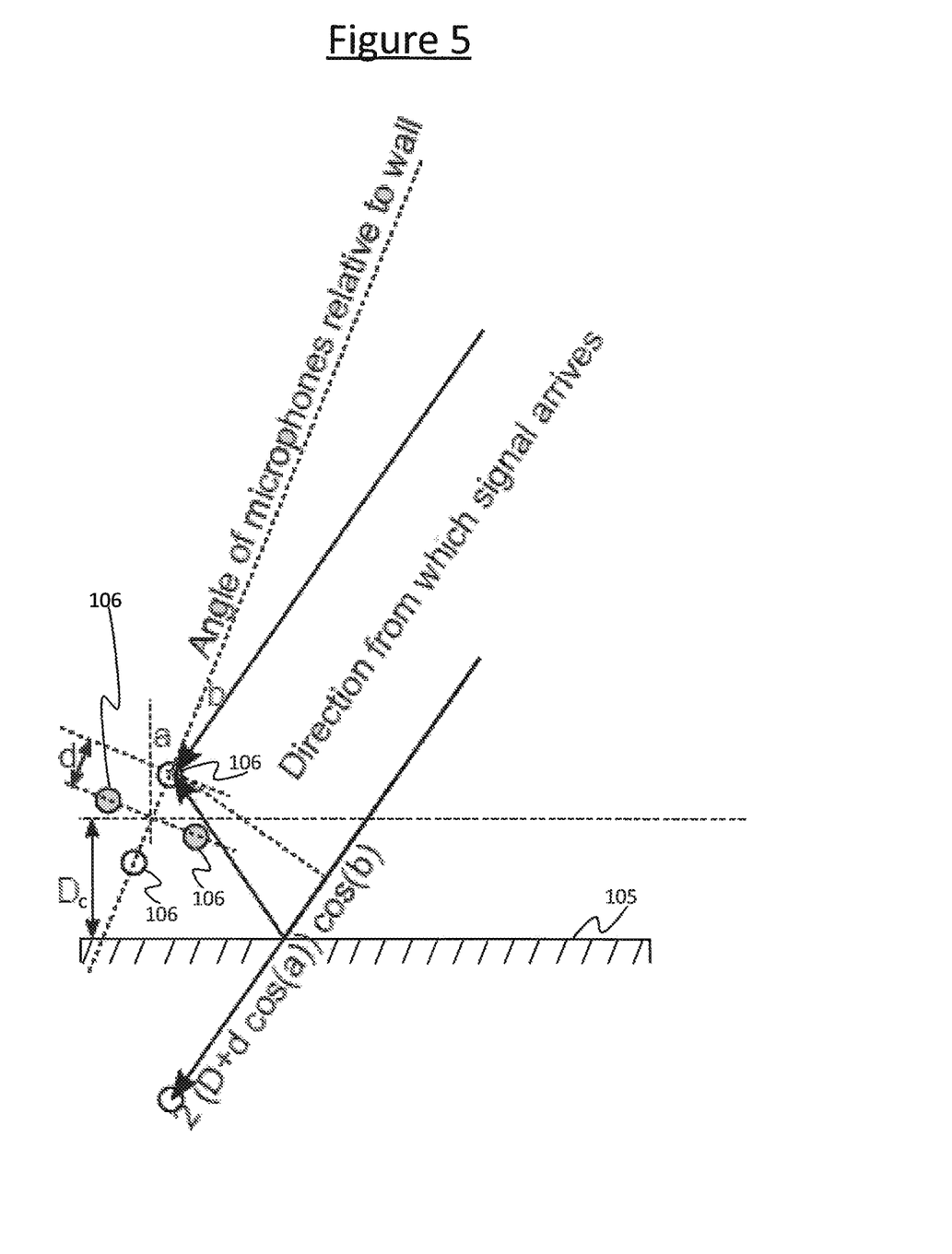
FIG. 5 schematically illustrates a relation between a, b, D, and d, where a is the angle of the microphone unit relative to a normal to the surface, b is the angle of the source relative to the microphone unit, D is the distance of the microphone unit from the surface, and d is the spacing between individual microphones of the device.

In the example illustrated, the individual microphones 106 of the microphone unit 104 are arranged in a square. Dc is the distance from, in this case, the centre of the microphone square to the hard surface 105, and a is the rotation angle. Note there is a subtle difference between the meaning of D in FIG. 1 and Dc in FIG. 5. In FIG. 1, D is the distance to a single microphone 106 (the distance from the surface 106 to microphone 106). In FIG. 5 on the other hand Dc is the distance from the surface 105 to an arrangement of microphones 106, e.g. to the centre of the arrangement, which in this case is a square.

Note that the far field reflection case set-out above is a simplification of the general system. This simplification has been chose as an illustration as it has an analytical solution. More complex solutions have numerical solutions that can be computed using, for example, iterative methods. For instance, referring to the near-field problem of Equations [i] and [ii] above, one can numerically find a solution using state-of-the-art minimization techniques.

The following gives an example of how to calculate b, Dc, and a. For example, assume that the array 104 has four microphones at angles 0, pi/2, pi, and 3pi/2; microphone n is at angle n×pi/2. If the device is rotated by an angle then microphone n is at an angle a+n.pi/2. The extra distance between the signal and the echo from the hard surface is 2(Dc+d cos(a+n.pi/2))cos(b), as is shown in FIG. 5. In addition to the unknowns b, Dc, and a, this equation also refers to the known distance d between the centre of the device and the microphone, and the microphone number n.

Now, if the signal processing module 107 measures at least three data points for three respective ones of microphones 106:

$$2(Dc+d\ \cos(a))\cos(b)=g0 \qquad\qquad \text{Equation [1]}$$

$$2(Dc+d\ \cos(a+pi/2))\cos(b)=g1=2(Dc-d\ \sin(a))\cos(b) \qquad \text{Equation [2]}$$

$$2(Dc-d\ \cos(a))\cos(b)=g2 \qquad\qquad \text{Equation [3]}$$

where g0, g1, and g2 are respective measurements of g. These three equations can be solved analytically by substitution, as follows.

Equation 1 yields the value of cos(b) in terms of unknowns Dc and a:

$$\cos(b)=g0/(2(Dc+d\ \cos(a)))$$

Substituting this in the second equation yields:

$$g1=2(Dc-d\ \sin(a))g0/(2(Dc+d\ \cos(a)))=(Dc-d\ \sin(a))g0/(Dc+d\ \cos(a))$$

Hence, g1 (Dc+d cos(a))=(Dc−d sin(a)) g0
Hence (g1−g0) Dc=d (−g0 sin(a)−g1 cos(a))
Hence Dc=(d (−g0 sin(a)−g1 cos(a)))/(g1−g0)
This expresses Dc in terms of a remaining unknown a. The third equation can now be used to calculate a:

$$g2=2(Dc-d\ \cos(a))g0/(2(Dc+d\ \cos(a)))$$

Hence Dc=(d (−g0 cos(a)−g2 cos(a)))/(g2−g0)
Hence (d (−g0 sin(a)−g1 cos(a)))/(g1−g0)=(d (−g0 cos(a)−g2 cos(a)))/(g2−g0)
Hence (−g0 sin(a)−g1 cos(a))/(g1−g0)=(−g0 cos(a)−g2 cos(a))/(g2−g0)
Hence (−g0 sin(a)−g1 cos(a))/(g1−g0)=((−g2−g0) cos(a))/(g2−g0)
Hence −sin(a) g0/(g1−g0)=cos(a) (g1/(g1−g0)+(−g2−g0)/(g2−g0))
Hence −sin(a)/cos(a)=(g1/(g1−g0)+(−g2−g0)/(g2−g0))/(g0/(g1−g0))
Hence a=−a tan((g1/(g1−g0)+(−g2−g0)/(g2−g0))/(g0/(g1−g0)))
Hence a=−a tan(2 (g0−g1)/(g2−g0)+1)
This enables a, Dc, and cos(b) to be computed given g0, g1, and g2.

Typically, with an array of more than three microphones, there are more than three g values available, but only three unknowns. This makes the problem over constrained and enables us to compute a more reliable approximation to b, Dc, and a.

Note that normally Dc and a change little over time, and only b changes with the speaker 102. Hence, long term averages for a and Dc can be established, and only b needs to be computed for each speaker 102 together with a minor deviation to Dc (due to the height of the speaker). That is, only b changes when either the speaker walks through the room, or when different people are talking. Dc only changes if the device is moved away or closer to the wall, and a only changes if the device is spun around. Dc is the distance between the reflective surface 105 and the microphone unit 104 (e.g. the centre of the square of microphones 106); and a is the rotation angle. Both of these are constant unless the device 106 is moved around, but that rarely happens. The person 102 however may walk around a lot, meaning that only the angle b changes continuously when the person is walking.

Note: while the above has described the use of three different microphones 106 to obtain at least three simultaneous equations, it is not essential to use at least three microphones in all possible embodiments. Alternatively for example, using multiple measurements from two microphones for different speaker locations over time will enable the signal processing module 107 to estimate Dc, a, and b.

Further, the simultaneous equations [1] to [3] above are not always required, since one or two of the unknowns may already be known from other parts of the system, or in principle could even be measured and input manually by a user. As an example where unknowns can be detected automatically by another part of the system, if the user device 103 contains a speaker, then the signal processing module 107 can use information from the AEC (Echo Canceller) to aid in working out where the first hard reflective surface 105 is. This cannot be used to compute b, which is the direction of the speaker, but it can be used to create an estimate for D and a. For example, a typical smart speaker device has a speaker and microphones built-in, e.g. a speaker in the bottom, and a couple of microphones on the top. When the speaker is producing sound, for example answering a query or playing music, that sound gets reflected off the hard surface and reaches the microphones. The AEC algorithm tries to predict an impulse response that describes all these paths—the distance to the reflective surface, the attenuation along the path, and the nature of the reflection; for each microphone 106. In this case, the impulse response will detect, for each microphone 106, a strong signal after a few microseconds (the direct path), and attenuated version (e.g. of −5 dB) after a time that is related to twice the distance D. This first loud echo indicates a nearby hard surface 105. This distance D will be different for each microphone 106 (as each microphone has a different distance from the hard surface), but an average can be used as Dc. The individual distances D for the microphones 106 can also be used to compute an initial estimate for a as well, as it can be seen which microphones are further and which are nearer, providing an indication of the complete orientation.

Figure 8:
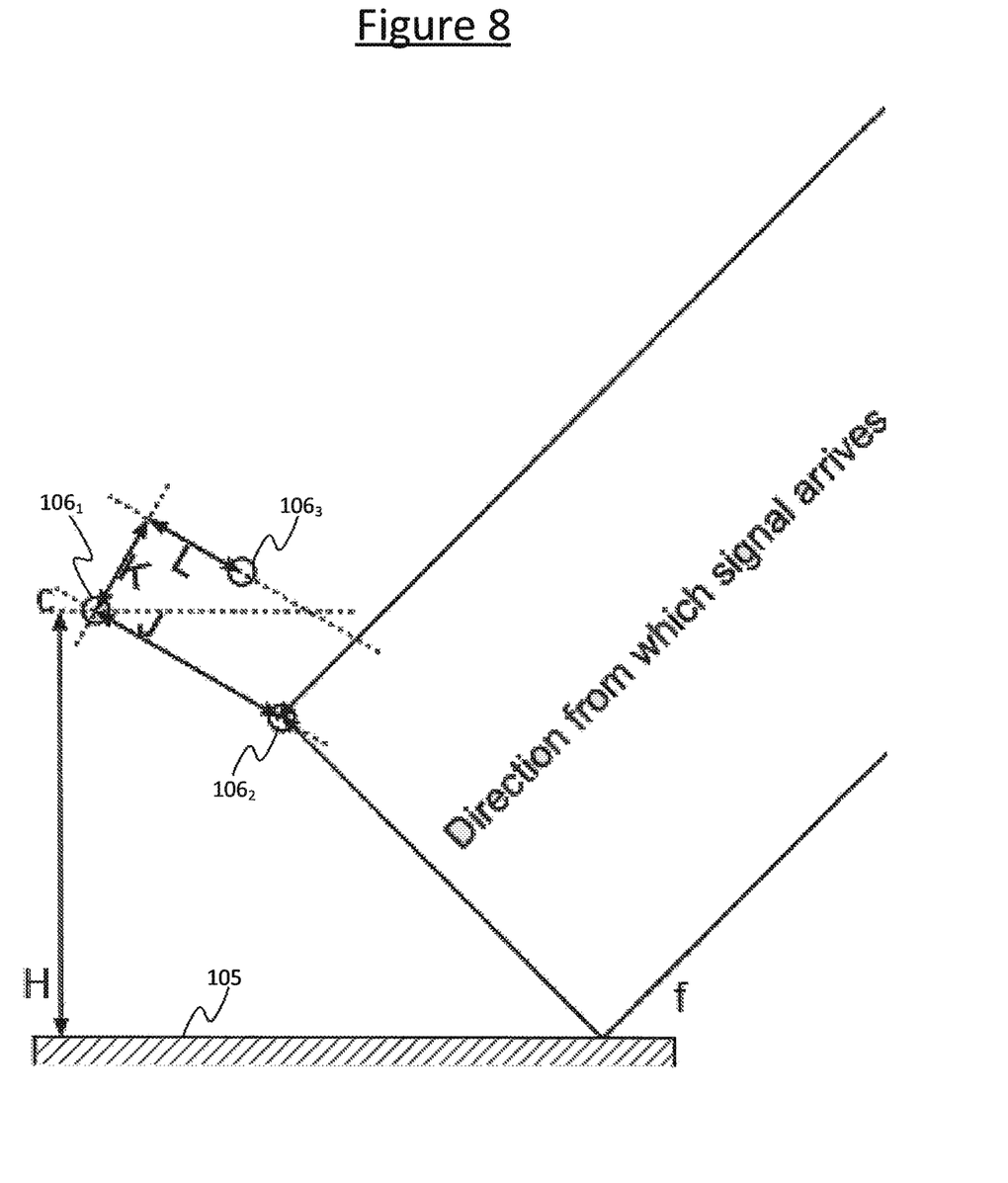
FIG. 8 schematically illustrates another example geometry involving three microphones in an arbitrary configuration.

Consider a system with three or more microphones $106_1$, $106_2$, $106_3$ at arbitrary locations, as shown in FIG. 8.

Without loss of generality, consider the first microphone #1 ($106_1$) to be at the origin of the device 104; the second microphone #2 ($106_2$) to be at a distance J right of the origin, and the third microphone #3 ($106_3$) to be at a distance K up and L right of the first microphone. I.e. they are at locations (0,0); (J,0); and (L,K). Assume that the topology of the microphones is known and fixed. Assume also that the microphone array 105 is placed with an unknown angle cat an unknown distance H from the wall.

The distances from the wall for the three microphones are then:
microphone #1: H,
microphone #2: H−J sin(c),
microphone #3: H−L sin(c)+K cos(c)
and any further microphones #4 and further follow the same pattern as microphone 3; rotating the vector (L,K) with an angle c, and adding the Y distance to H.

Given an, unknown, direction of arrival at an angle f, there is hence an extra distance 2X/cos(f) where X is the distance from the microphone to the wall.

One can define the comb values expected given H, c, and f as follows:

$N1=2H/\cos(f)$, $N2=2(H-J\sin(c))/\cos(f)$, $N3=2(H-L\sin(c)+K\cos(c))/\cos(f)$ with further N-values for any more microphones.

So given an observed extra distance M1, M2, M3 for each of the microphones #1, #2, #3 respectively ($106_1$, $106_2$, $106_3$ in FIG. 8), as solution is sought whereby:
N1=M1, N2=M2, M3=N3

These three equations have three unknowns. Under the right conditions these equations have a unique solution. With more microphones, the system will be over-constrained, which will allow the finding of a better solution. In either case, the minimum least square error can be found by minimising:

$$(N1-M1)^2+(N2-M2)^2+(N3-M3)^2+\ldots$$

There is no straight-forward analytical method to minimise the above equation, but a variety of numerical solvers can be used, given known values for J, K, L and known measurements for M1, M2, and M3. Example solvers may be based on algorithms such as the Levenberg-Marquardt algorithm, and can be found in, for example, Matlab, the GNU numerical library, or Libreoffice. As an example, given measurements of 0.283, 0.212, and 0.309 for M1, M2, and M3 and microphone locations of 0.05 (J), 0.025 (K) and 0.025 (L), a numerical solver can compute a distance of 0.100 for H, and an angles of 30 degrees (for c) and 45 degrees (for f).

The scope of the disclosure is not limited by the particular mathematical examples given. Once given the ideas disclosed herein, the skilled person will be able to apply other analytical or numerical methods in his or her toolbox to analyse the geometry of the system.

Note again also, that the white noise used does not have to be instantaneous. Instead, it can be white noise created over time, e.g. a sweep of a sine wave, or indeed, music or speech aggregated over time. In general the techniques disclosed herein can be performed based on any signal that, either instantaneously or over time, has white noise characteristics.

Furthermore, the disclosed techniques can also be used to deal with an echo comprising reflections from more than one surface 105. In some scenarios there may be multiple hard surfaces near the microphone device 104. For example, it may be placed near a wall, on a table, or it may be placed in a corner of a room. In this case, there are multiple sources of interference of the signal, resulting in a signal that has multiple combs that are superimposed onto each other. The geometry of the system may then be modelled as a superposition of two instance of the one-surface model described above. Multiple surfaces will cause the comb functions to be juxtaposed over each other. Each comb has a distance between troughs that is governed by the extra time taken by the echo path; and the depth of the comb is related to the strength of the echo path. For example, a surface at a reflective distance of 500 μs away will cause a comb with a periodicity of 1 kHz (2 times 500 μs); whilst a second surface on a distance of 150 μs away will cause a comb with a periodicity of 3.333 kHz. A Fourier analysis can be used over the magnitude of the spectrum to work out what frequencies those combs have. Peaks in the result of the Fourier transform indicate combs in the input spectrum. The above equations can be used independently on each comb.

The following describes some example use cases that may be implemented based on the above-described techniques. The control functionality for these may again be implemented by the signal processing module 107.

In a first category of use case, b can be used to point to the direction of the sound source 102, taking into account the reflecting wall 105. This will enable the controller 107 for example: (a) to control an indicator 111, such as by lighting up a visible indicator or activating an audible or tactile indicator to point out where the sound is coming from (user feedback); (b) to aim a camera 108 or other sensor (e.g. presence sensor or actuator) at the location of the sound; and/or (c) to point the acoustic beam-former 104, 109 toward the direction of the sound (the beam-former comprising the multiple microphones 106 plus the algorithm 109 where the different signals are suitably processed to enhance the signal of that direction).

In particular, since human voice contains many elements that have a wide spread of frequencies (such as hissing and sissing sounds made with the tongue, and plosive sounds made with the lips, for example the 'S' and 'F' sounds in many western languages), this can be used to locate a human talking.

In a second category of use cases, knowledge of the combination of D, b, and a can be used to identify the frequency characteristics of each of the microphones $106_1$, $106_2$, . . . , taking into account the comb filter created. For example, voice processing can for each part of the frequency spectrum pick a good microphone $106_n$ to receive audio in said frequency spectrum. This can be used to avoid 'nulls', and get a balanced frequency response of the signal.

In addition or instead of this, equalisation filters can be applied to the microphones to straighten out the frequency responses on the basis of establishing the shape of the comb in the frequency response. That is, the spectral shape can be used to rectify the signal and straighten out the frequency response. In this case the signal processing module 107 is configured to apply an equaliser to the each microphone 106 in order, based on the detected frequency response, to amplify the frequency bands that have been attenuated. That is to say, the equalizer reverses the effect of the frequency response or "comb" caused by the echo. Signals that have been strongly attenuated (i.e. nulled), can no longer be amplified as they have all but disappeared; but if the nulls aren't too deep, the signal equalizer can straighten the response back out, improving the signal quality for later stage.

Regarding a third category of use case, many home devices, such as air conditioning units and dishwashers produce wide spectrum noise. Other static devices, such as radios or music players will not produce white noise at any one time, but are likely to in the long term play a full range of frequencies at similar levels. During otherwise quiet periods estimating b and a can be used to identify where such devices are. This in turn can be used to attenuate sound coming from those directions by using the multiple microphones 106 and the beamforming 109. Side lobe cancelling may also be used to reduce the contribution from unwanted devices.

Note that the applications of the presently disclosed techniques are not limited to speech recognition and the arrangement shown in FIG. 7 is only for illustrative purposes. For instance, instead of recognizing speech, the speech recognition algorithm 110 may be replaced or supplemented with another type of sound recognition module, e.g. for recognizing the sounds of animals or other devices. In general the sound recognition algorithm 110 may be used to detect the sound of any being, object or event of interest, for instance to alert a user when a certain sound of such a being, object or event is detected. For example the signal processing module 107 may be configured detect a sound made by a pet when in need of attention (e.g. a dog barking), or the sound of a burglar breaking into the user's home, and to output an altert via any suitable visual, audio or tactile (e.g. vibrating) indicator 111 (which could be located in the same environment as the sound or remotely, e.g. to alert the user when away from home). As another example, the sound recognition algorithm 110 may be configured to recognize the sound made by a household appliance, e.g. to detect the sound of a kettle boiling (which comprises white noise), and the signal processing module 107 may be configured to use the indicator 111 to alert the user to this event. In yet further examples, the microphone unit 104 may be part of a device such as a speaker phone, and the signal processing module 107 may be configured to use the detected frequency response to equalize the captured speech for the purpose of a better quality call, and/or may be configured to control some other directional sensor to be directed toward the currently speaking participant in a call (e.g. controlling a camera sending video as part of the call to focus on that person).

It will be appreciated that the above embodiments have been described by way of example only. Other variants and applications of the described techniques may be apparent to a person skilled in the art once given the present disclosure. The scope of the present disclosure is not limited by the above-described embodiments but only by the accompanying claims.

The invention claimed is:

1. A method of using a directional microphone unit, the directional microphone unit comprising an array of constituent microphones spaced apart from one another, and the method comprising:
   at each respective one of a plurality of the microphones, receiving substantially white noise via a direct path from a source of the white noise and also receiving an echo comprising a reflection of the white noise from at least one reflective surface, and thereby obtaining a received noise signal comprising a combination of the directly-received noise and the echo as received by the respective microphone;
   for each of the plurality of microphones, identifying a spacing between lobes and/or troughs in a respective spectrum of the received noise signal as received by the respective microphone, thereby determining an additional distance travelled by the echo to the respective microphone relative to the direct path;
   calculating a direction of the source based on the additional distance travelled for each of said plurality of microphones; and
   based on the calculated direction of the source, directing one or more directional sensors and/or indicators to target or avoid the source of the noise.

2. The method of claim 1, wherein the one or more directional sensors comprise at least said directional microphone unit, said directing comprising applying a respective weight to each of the microphones in the array, thereby forming a receive beam that targets or avoids the source of the noise.

3. The method of claim 1, wherein the source comprises a person, the white noise comprising a plosive or fricative sound spoken by said person.

4. The method of claim 3, wherein said directing comprises controlling the sensor and/or indicator to target the person.

5. The method of claim 1, wherein said calculating comprises solving a set of simultaneous equations, each equation in the set relating the additional distance travelled by the echo to each respective one of the plurality of microphones to three unknowns: a distance of the microphone unit from the surface, an angle of the source relative to the microphone unit, and a rotation of the microphone unit relative to the surface.

6. The method of claim 5, comprising using an echo cancelling algorithm to determine a distance of the microphone from the surface and a rotation of the microphone from the surface, and then combining with the spacing to determine the direction of the source.

7. The method of claim 1, wherein said calculating comprises applying a numerical optimization algorithm.

8. The method of claim 2, wherein the method comprises performing a sound recognition algorithm to recognize one or more elements in sound received via said directional microphone unit, and wherein said directing comprises controlling the receive beam to target the source of said noise as part of the sound recognition.

9. The method of claim 8, wherein:
the source comprises a person, the white noise comprising a plosive or fricative sound spoken by said person; and
the sound recognition algorithm comprises a speech recognition algorithm for recognizing an intention in the person's speech, and wherein said directing comprises controlling the receive beam to target the direction of the person as part of the speech recognition.

10. The method of claim 2, wherein the method comprises performing a sound recognition algorithm to recognize one or more elements in sound received via said directional microphone unit, and wherein said directing comprises controlling the receive beam to avoid the direction of the source during the sound recognition.

11. The method of claim 10, wherein the sound recognition algorithm comprises a speech recognition algorithm for recognizing an intention in a person's speech, and wherein said directing comprises controlling the receive beam to avoid the source of the noise during the speech recognition.

12. The method of claim 10, wherein the source of the noise is a household or office appliance.

13. The method of claim 12, wherein the household appliance comprises a washing machine, dishwasher, air-conditioning unit, heating unit, fan unit, kettle, printer, photocopier or scanner.

14. The method of claim 1, wherein the one or more directional sensors comprise a camera or other non-audio sensor, and said directing comprises directing the camera or other non-audio sensor toward the direction of the source.

15. The method of claim 1, wherein said directing comprises controlling the indicator to indicate a direction of the source of said noise to a user.

16. The method of claim 15, wherein said indicator comprises a light or other visual indicator arranged to indicate said direction by indicating a position of the source.

17. The method of claim 1, wherein the method further comprises:
performing a sound recognition algorithm to recognize one or more elements in sound received via said directional microphone unit;
identifying spectral locations of the lobes and/or troughs; and
on a per frequency band basis, selecting one or a subset of the microphones of the array not experiencing troughs in the frequency band, and using only the selected one or subset of microphones to receive the sound for said sound recognition.

18. The method of claim 17, wherein the sound recognition algorithm comprises a speech recognition algorithm for recognizing an intention in the person's speech, only the selected one or subset of the microphones being used to receive the speech for said speech recognition.

19. The method of claim 1, wherein the method further comprises, based on the respective spectrum, equalizing one or more of the microphones to at least partially reverse a frequency response caused by the echo.

20. The method of claim 1, wherein:
said echo comprises a reflection of the white noise from a plurality of reflective surfaces;
said identifying comprises modelling the received noise signal as a superposition of respective spectra resulting from each of the surfaces, and identifying the spacing between lobes and/or troughs in the respective spectrum of each surface, thereby determining an additional distance travelled by the echo from each surface relative to the direct path; and
said calculating of the direction of the source is based on the additional distances travelled via each of said surfaces.

21. A computer program product embodied on non-transitory computer-readable storage and configured so as when run on one or more processing units to perform operations in accordance with claim 1.

22. A user device comprising the directional microphone unit and control logic configured to perform the method of claim 1.

23. The user device of claim 22, wherein the control logic comprises memory comprising one or more memory units and processing apparatus comprising one or more processing units, the memory storing code arranged to run on the processing apparatus, and the code being configured so as when run on the processing apparatus to perform the method.

* * * * *